United States Patent
Mathis

(10) Patent No.: US 9,629,488 B1
(45) Date of Patent: Apr. 25, 2017

(54) ICE-SURROUNDED PLATE CARRIER

(71) Applicant: Kenneth Mathis, Rancho Cordova, CA (US)

(72) Inventor: Kenneth Mathis, Rancho Cordova, CA (US)

( * ) Notice: Subject to any disclaimer, the term of this patent is extended or adjusted under 35 U.S.C. 154(b) by 0 days.

(21) Appl. No.: 15/159,609

(22) Filed: May 19, 2016

(51) Int. Cl.
*A47G 19/02* (2006.01)
*A47G 23/04* (2006.01)
*A47G 23/06* (2006.01)

(52) U.S. Cl.
CPC ............ *A47G 19/027* (2013.01); *A47G 23/04* (2013.01); *A47G 23/0683* (2013.01); *A47G 2023/0691* (2013.01)

(58) Field of Classification Search
CPC ...... A47G 19/027; A47G 19/02; A47G 23/04; A47G 23/0683; F25C 5/18; F16N 31/002; B65D 1/34; B65D 1/36; B65D 25/04
USPC ............ 220/574.2, 574, 23.89, 23.88, 23.87, 220/23.83, 571, 556, 555, 553; 62/464, 62/463, 459, 457.6, 457.2; 206/508
See application file for complete search history.

(56) References Cited

U.S. PATENT DOCUMENTS

| | | | |
|---|---|---|---|
| 2,179,095 A * | 11/1939 | Kelsey | A01K 97/05 220/521 |
| 3,555,848 A | 1/1971 | Johnson | |
| 3,608,770 A * | 9/1971 | Naimoli | B65D 1/36 206/545 |
| 3,757,852 A | 9/1973 | Allinger | |
| 3,915,532 A * | 10/1975 | Ashton | B65D 25/02 206/557 |
| 3,927,701 A * | 12/1975 | Lederer | B67C 3/22 141/98 |
| 5,372,274 A * | 12/1994 | Freedland | A47G 23/04 220/571 |
| 5,390,797 A | 2/1995 | Smalley et al. | |
| 2008/0216507 A1* | 9/2008 | Tremblay | A47J 47/10 62/457.2 |
| 2011/0180549 A1* | 7/2011 | Roellich | A47G 19/027 220/592.01 |

FOREIGN PATENT DOCUMENTS

GB          2113074 A  *  8/1983   ......... A47G 23/0241

* cited by examiner

*Primary Examiner* — Robert J Hicks
(74) *Attorney, Agent, or Firm* — Stevenson IP, LLC

(57) ABSTRACT

An ice-surrounded plate carrier including a bowl-shaped bottom drainage holder, a bowl-shaped middle ice holder, and a pair of upright dividers disposed within the middle ice holder. A plurality of compartments is disposed within the middle ice holder. Each of a plurality of drain holes is disposed through the middle ice holder. A plurality of ice cubes is disposed within the plurality of compartments, and a plate is removably disposed atop the pair of upright dividers. A flattened dome-shaped lid is removably disposed atop the bottom drainage holder.

2 Claims, 4 Drawing Sheets

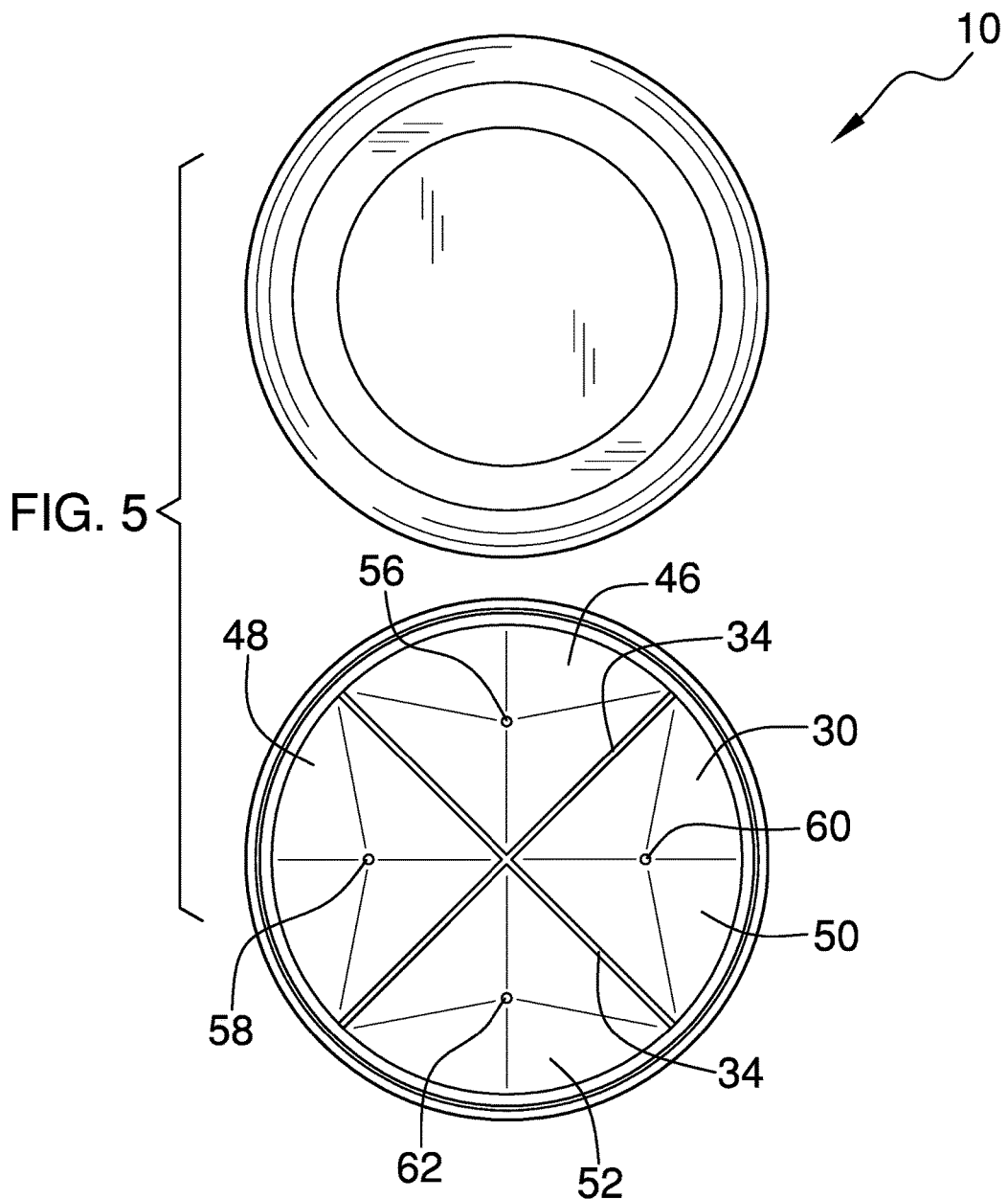

ICE-SURROUNDED PLATE CARRIER

BACKGROUND OF THE INVENTION

Various types of plate carriers are known in the prior art. However, what has been needed is an ice-surrounded plate carrier including a bowl-shaped bottom drainage holder, a bowl-shaped middle ice holder, and a pair of upright dividers disposed within the middle ice holder. What has been further needed is a plurality of compartments disposed within the middle ice holder, with each of a plurality of drain holes disposed through the middle ice holder. Lastly, what has been needed is a plurality of ice cubes disposed within the plurality of compartments, a plate removably disposed atop the pair of upright dividers, and a flattened dome-shaped lid removably disposed atop the bottom drainage holder. The ice-surrounded plate carrier is uniquely structured to simultaneously transport and refrigerate a single plate of food, which reduces the likelihood of bacterial contamination and spoilage while the food is in transport. The ice-surrounded plate carrier is thus ideally suited for those times when a user must transport a plate of food to and from an event or party. A serving tray can also be placed within the ice-surrounded plate carrier while food is being served at an event or party in order to maintain a cool temperature of the food being served.

FIELD OF THE INVENTION

The present invention relates to plate carriers, and more particularly, to an ice-surrounded plate carrier.

SUMMARY OF THE INVENTION

The general purpose of the present ice-surrounded plate carrier, described subsequently in greater detail, is to provide an ice-surrounded plate carrier has many novel features that result in an ice-surrounded plate carrier which is not anticipated, rendered obvious, suggested, or even implied by prior art, either alone or in combination thereof.

To accomplish this, the present ice-surrounded plate carrier includes a bowl-shaped bottom drainage holder having a circular middle section encircled by an upwardly extended continuous bottom outer rim having a top edge. A bowl-shaped middle ice holder has a circular middle area encircled by an upwardly extended continuous middle outer rim. A pair of upright dividers includes a horizontal divider and a vertical divider, with the horizontal divider medially and continuously disposed from a right portion of the middle ice holder to a left portion of the middle ice holder, and the vertical divider medially and continuously disposed from an upper portion of the middle ice holder to a lower portion of the middle ice holder.

The ice-surrounded plate carrier further includes each of a right upper compartment, a left upper compartment, a right lower compartment, and a left lower compartment of a plurality of compartments. Each of the right upper compartment, the left upper compartment, the right lower compartment, and the left lower compartment is disposed within the middle ice holder and formed by the middle outer rim of the middle ice holder and the pair of upright dividers. Each of a right upper drain hole, a left upper drain hole, a right lower drain hole, and a left lower drain hole of a plurality of drain holes is medially disposed through the middle area of the middle ice holder in each of the right upper compartment, the left upper compartment, the right lower compartment, and the left lower compartment, respectively.

A diameter of the bottom outer rim of the bottom drainage holder is greater than a diameter of the middle outer rim of the middle ice holder so that the middle ice holder is removably disposed within the bottom drainage holder. A plurality of ice cubes is disposed within the plurality of compartments, and a plate is removably disposed atop the pair of upright dividers. A flattened dome-shaped lid is removably disposed atop the bottom drainage holder, with the lid having a top surface and a continuous outer edge. A diameter of the outer edge of the lid is equal to a diameter of the top edge of the bottom outer rim of the bottom drainage holder so that the placement of the lid on the bottom drainage holder creates an ice chest effect in order to keep the food disposed on the plate cold. The lid further optionally includes a circular depression medially disposed within the top surface and a disc-shaped stacking member medially disposed on the depression. The combination of the circular depression and the stacking member allows a plurality of ice-surrounded plate carriers to be stacked atop each other.

Thus has been broadly outlined the more important features of the present ice-surrounded plate carrier so that the detailed description thereof that follows may be better understood and in order that the present contribution to the art may be better appreciated.

BRIEF DESCRIPTION OF THE DRAWINGS

Figures

FIG. 5 is a top plan view.

DETAILED DESCRIPTION OF THE DRAWINGS

Figure 1:
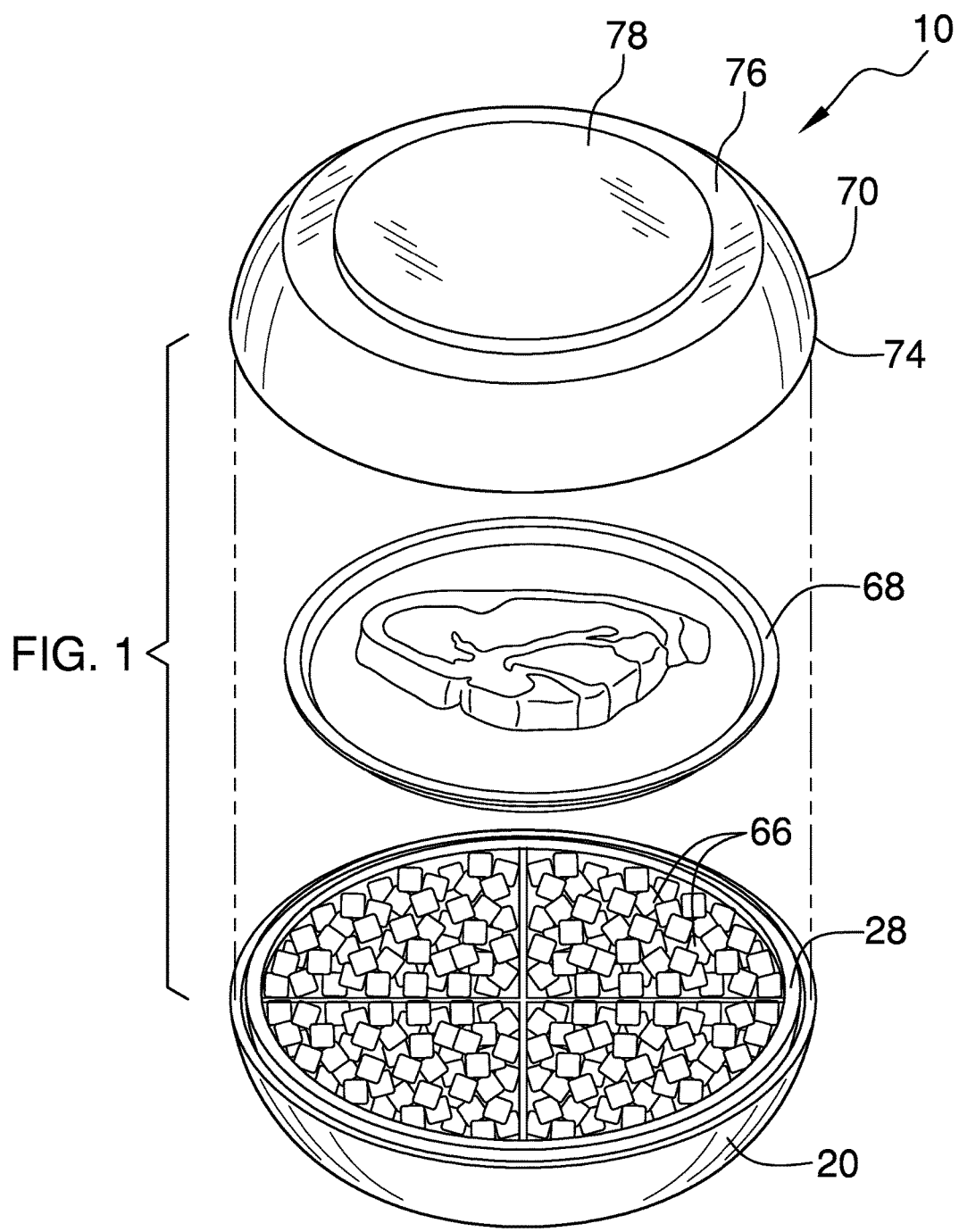
FIG. 1 is an exploded view.
Figure 2:
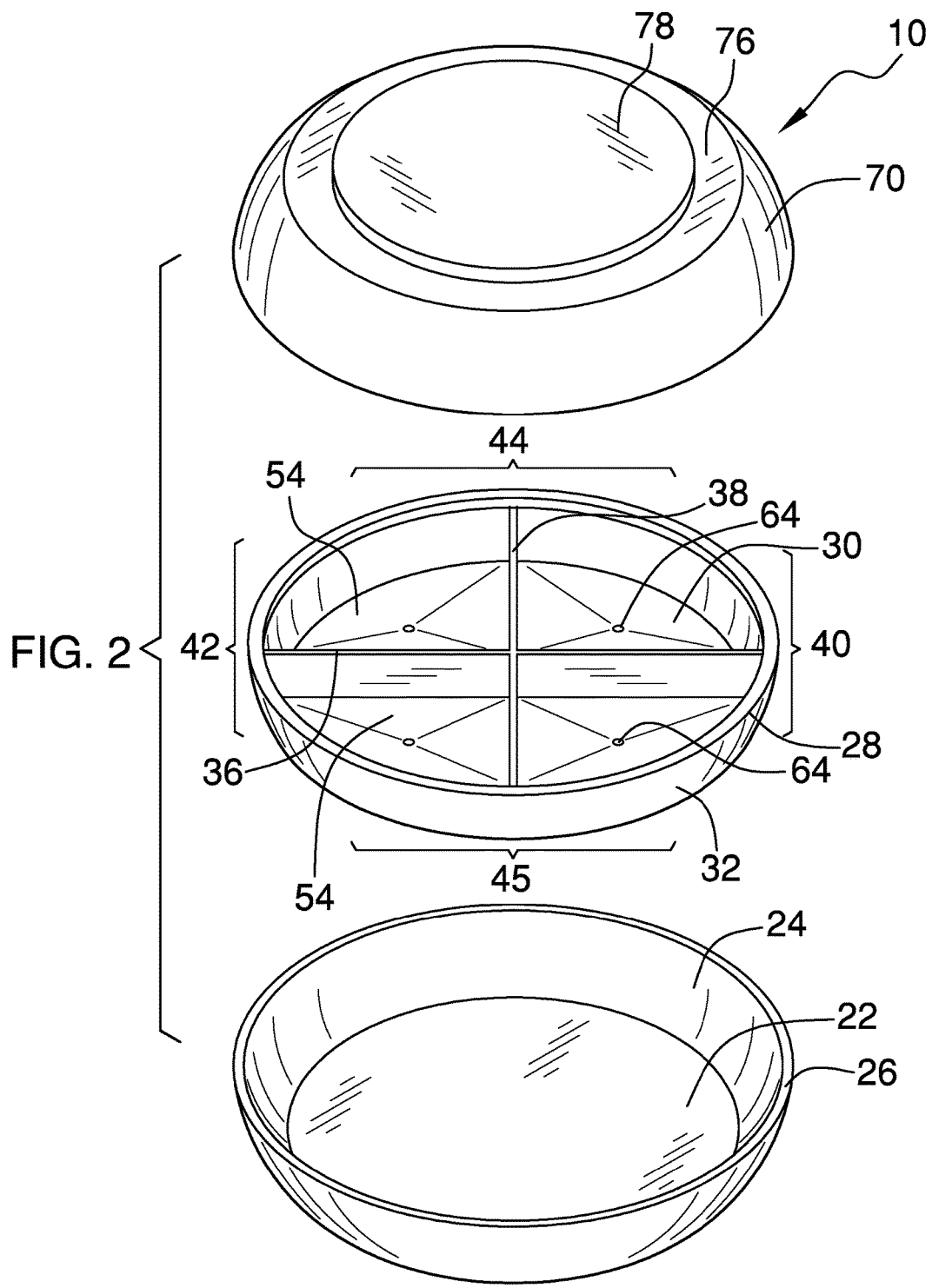
FIG. 2 is a front isometric view.
Figure 3:
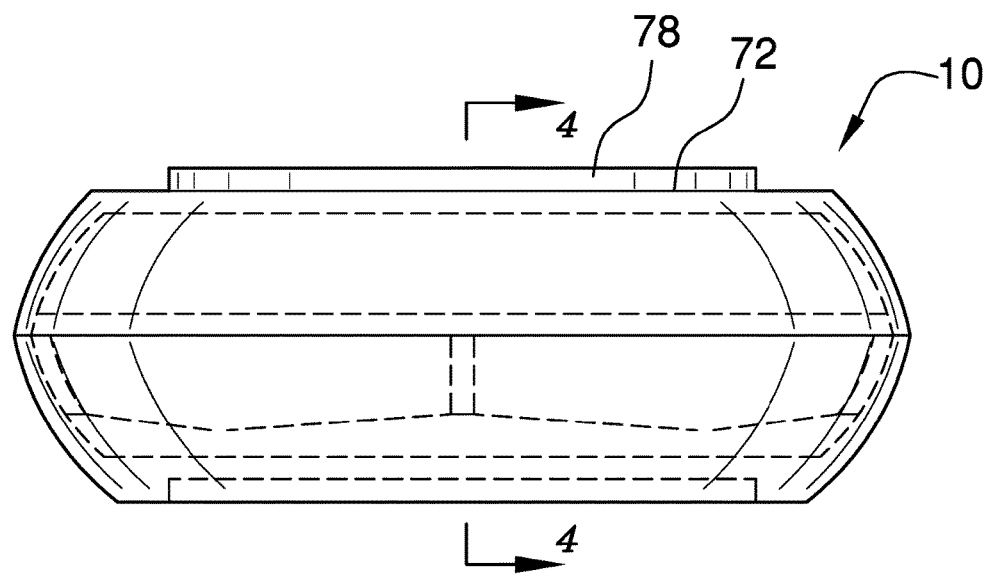
FIG. 3 is a side elevation view.
Figure 4:
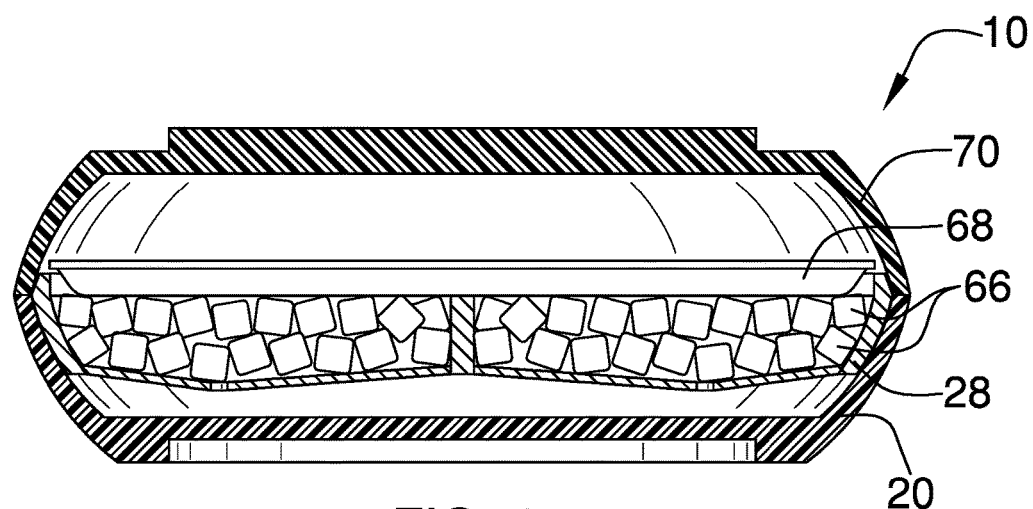
FIG. 4 is a cross-sectional view taken along line 4-4 of FIG. 3.

With reference now to the drawings, and in particular FIGS. 1 through 5 thereof, an example of the instant ice-surrounded plate carrier employing the principles and concepts of the present ice-surrounded plate carrier and generally designated by the reference number 10 will be described.

Referring to FIGS. 1 through 5 the present ice-surrounded plate carrier 10 is illustrated. The ice-surrounded plate carrier 10 includes a bowl-shaped bottom drainage holder 20 having a circular middle section 22 encircled by an upwardly extended continuous bottom outer rim 24 having a top edge 26. A bowl-shaped middle ice holder 28 has a circular middle area 30 encircled by an upwardly extended continuous middle outer rim 32. A pair of upright dividers 34 includes a horizontal divider 36 and a vertical divider 38, with the horizontal divider 36 medially and continuously disposed from a right portion 40 of the middle ice holder 28 to a left portion 42 of the middle ice holder 28, and the vertical divider 38 medially and continuously disposed from an upper portion 44 of the middle ice holder 28 to a lower portion 45 of the middle ice holder 28.

The ice-surrounded plate carrier 10 further includes each of a right upper compartment 46, a left upper compartment 48, a right lower compartment 50, and a left lower compartment 52 of a plurality of compartments 54. Each of the right upper compartment 46, the left upper compartment 48, the right lower compartment 50, and the left lower compartment 52 is disposed within the middle ice holder 28 and formed by the middle outer rim 32 of the middle ice holder 28 and the pair of upright dividers 34. Each of a right upper drain hole 56, a left upper drain hole 58, a right lower drain hole 60, and a left lower drain hole 62 of a plurality of drain holes 64 is medially disposed through the middle area 30 of the middle ice holder 28 in each of the right upper compartment 46, the left upper compartment 48, the right lower compartment 50, and the left lower compartment 52, respectively.

A diameter of the bottom outer rim 24 of the bottom drainage holder 20 is greater than a diameter of the middle outer rim 32 of the middle ice holder 28. The middle ice holder 28 is removably disposed within the bottom drainage holder 20. A plurality of ice cubes 66 is disposed within the plurality of compartments 54, and a plate 68 is removably disposed atop the pair of upright dividers 34. A flattened dome-shaped lid 70 is removably disposed atop the bottom drainage holder 20, with the lid 70 having a top surface 72 and a continuous outer edge 74. A diameter of the outer edge 74 of the lid 70 is equal to a diameter of the top edge 26 of the bottom outer rim 24 of the bottom drainage holder 20. The lid 70 further optionally includes a circular depression 76 medially disposed within the top surface 72 and a disc-shaped stacking member 78 medially disposed on the depression 76.

What is claimed is:

1. An ice-surrounded plate carrier comprising:
   a bowl-shaped bottom drainage holder having a circular middle section encircled by an upwardly extended continuous bottom outer rim, the bottom outer rim having a top edge;
   a bowl-shaped middle ice holder having a circular middle area encircled by an upwardly extended continuous middle outer rim;
   a pair of upright dividers comprising a horizontal divider and a vertical divider, wherein the horizontal divider is medially and continuously disposed from a right portion of the middle ice holder to a left portion of the middle ice holder, and the vertical divider is medially and continuously disposed from an upper portion of the middle ice holder to a lower portion of the middle ice holder;
   a plurality of compartments comprising a right upper compartment, a left upper compartment, a right lower compartment, and a left lower compartment, each of the right upper compartment, the left upper compartment, the right lower compartment, and the left lower compartment disposed within the middle ice holder and formed by the middle outer rim of the middle ice holder and the pair of upright dividers;
   a plurality of drain holes comprising a right upper drain hole, a left upper drain hole, a right lower drain hole, and a left lower drain hole, each of the right upper drain hole, the left upper drain hole, the right lower drain hole, and the left lower drain hole medially disposed through the middle area of the middle ice holder in each of the right upper compartment, the left upper compartment, the right lower compartment, and the left lower compartment, respectively;
   wherein a diameter of the bottom outer rim of the bottom drainage holder is greater than a diameter of the middle outer rim of the middle ice holder;
   wherein the middle ice holder is removably disposed within the bottom drainage holder;
   wherein a plurality of ice cubes is disposed within the plurality of compartments;
   wherein a plate is removably disposed atop the pair of upright dividers; and
   a flattened dome-shaped lid removably disposed atop the bottom drainage holder, the lid having a top surface and a continuous outer edge;
   wherein a diameter of the outer edge of the lid is equal to a diameter of the top edge of the bottom outer rim of the bottom drainage holder.

2. The ice-surrounded plate carrier of claim 1 wherein the lid has a circular depression medially disposed within the top surface and a disc-shaped stacking member medially disposed on the depression.

\* \* \* \* \*